Figure 1:
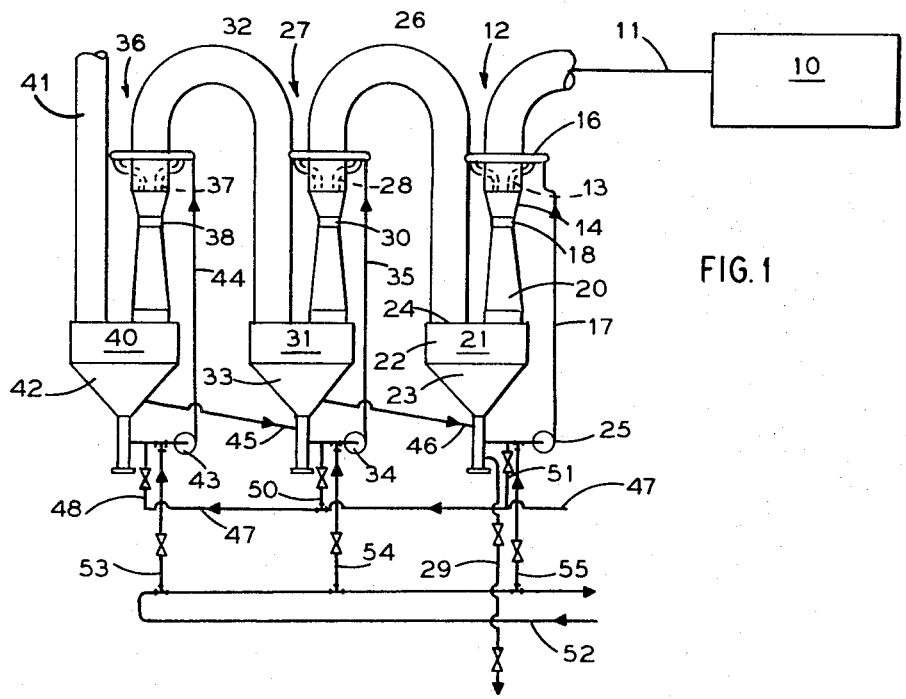

United States Patent

[11] 3,615,165

[72] Inventor John L. Clement
Akron, Ohio
[21] Appl. No. 782,592
[22] Filed Dec. 10, 1968
[45] Patented Oct. 26, 1971
[73] Assignee The Babcock & Wilcox Company
New York, N.Y.

[54] GASEOUS SULFUR DIOXIDE ABSORPTION SYSTEM
2 Claims, 4 Drawing Figs.
[52] U.S. Cl. .................................................... 23/2 R,
23/130, 23/178 S
[51] Int. Cl. ...................................................... B01d 53/34
[50] Field of Search .......................................... 23/2, 178,
178 S, 130, 131

[56] References Cited
UNITED STATES PATENTS
2,351,780 6/1944 Palmrose ...................... 23/130
3,273,961 9/1966 Rogers et al. .................. 23/178 X Primary Examiner—Earl C. Thomas
Attorney—J. Maguire ABSTRACT: A system for the absorption of $SO_2$ from gases of combustion where the gases are passed in series through a plurality of direct contact zones. The absorption liquid is made up of a solution of magnesium and sulfur which is sprayed into the gas, and the makeup water in the solution is selectively added into the last stage zone for optimum $SO_2$ absorption efficiency of the entire system.

3,615,165

PATENTED OCT 26 1971

SHEET 1 OF 3

INVENTOR.
John L. Clement
BY
J. Maguire
ATTORNEY

GASEOUS SULFUR DIOXIDE ABSORPTION SYSTEM

The present invention relates to the absorption of the $SO_2$ contained in combustion gases and more particularly to the absorption of gaseous $SO_2$ in an absorption liquid containing magnesium.

Magnesium base chemicals in liquid form have proven highly effective in removing $SO_2$ gases from the products of combustion resulting from the incineration of residual liquors. When used in the chemical recovery system of a pulp and paper installation, both the magnesium compounds and the $SO_2$ absorbed in the magnesium may be reused in the chemical process. This procedure has been disclosed and claimed in U.S. Pats. Nos. 2,268,456 and 3,092,535, for example. However, the $SO_2$ absorption from flue gases may be applied to the products of combustion resulting from both the incineration of pulp residual liquors and the combustion of other sulfur-containing fuels. When used in the latter case, the absorbed $SO_2$ may be separately processed for reclamation of the sulfur components in a useable sulfur form as for example $SO_2$ liquid, sulfuric acid or as elemental sulfur. In such a process, the magnesium compounds may be recycled and treated for reuse in the $SO_2$ absorption system. Under such circumstances, it will be necessary to add magnesium to the absorption system as a makeup for necessary losses of magnesium compounds. However, the magnesium makeup requirements can be a minimum and can be relatively inexpensive depending upon the source of the magnesium compounds.

Insofar as the $SO_2$ absorption is concerned, regardless of the source of $SO_2$ in the gases, the magnesium base absorbing liquid will be introduced in spray contact relationship to the $SO_2$ containing gases in, for example, a series arrangement of venturi scrubbers. In each of the venturi scrubbers the $SO_2$ containing gases will be contacted by a magnesium-sulfur liquid spray where the active $SO_2$ absorbing ingredient will be magnesium monosulfite. In each of the absorbing zones, the liquid and gases will be separated, the gases passed in series through further absorbing zones in contact with recirculated, treated absorbing liquid. The general chemical procedure follows the following reactions:

1. $H_2O(excess) + SO_2 \longrightarrow H_2SO_3 + H_2O$
2. $H_2SO_3(excess) + MgO + H_2O \rightarrow Mg(HSO_3)_2 + H_2SO_3 + H_2O$
3. $H_2SO_3 + MgO + H_2O \longrightarrow Mg(HSO_3)_2 + H_2O$
4. $Mg(HSO_3)_2(excess + H_2O + MgO \rightarrow Mg(HSO_3)_2 + MgSO_3 + H_2O$
5. $Mg(HSO_3)_2 bz MgO + H_2O \longrightarrow 2MgSO_3 + 2H_2O$
6. $MgSO_3 + H_2O + SO_2 \longrightarrow Mg(HSO_3)_2$ If MgO is added to the aqueous $Mg(HSO_3)_2$ solution of fixed $SO_2$ concentration, the MgO will react with $Mg(HSO_3)_2$ forming $MgSO_3$ according to reaction (4). As a result, the Mg ion concentration in the acid increases. When the amounts of MgO, $SO_2$ and $H_2O$ are in solution equilibrium, a saturated solution of $Mg(HSO_3)_2 + MgSO_3$ in water will be obtained. If the $SO_2$ concentration is increased, then reaction (6) will occur, converting $MgSO_3$ to $Mg(HSO_3)_2$, and no precipitation of $MgSO_3$ or MgO will take place. Decreasing the dissolved $SO_2$ concentration to change the equilibrium proportion of MgO, $SO_2$ and $H_2O$, the excess MgO will precipitate out of the solution. Increasing the $H_2O$ content will merely dilute the solution, whereas decreasing the $H_2O$ content will change the equilibrium and tend to precipitate $MgSO_3$.

In the present invention it has been found that most efficient absorption of $SO_2$ in the various series-arranged absorption zones can be obtained by careful regulation of the chemical consist of the individual spray liquids. As the $SO_2$ gas is passed in series through successive absorption zones the $SO_2$ content of the gases will be progressively reduced. Thus, in each absorption zone it will be desirable to carefully regulate both the acid strength and the monosulfite content of the spray liquid to correspond with the $SO_2$ gas content for most efficient absorption. This can be accomplished by regulation of the addition of magnesium hydroxide and water to each of the zones. In the present invention, the product of the absorption system is removed in liquid form from the liquid gas separating zone of the first $SO_2$ absorption zone. Thus, the total liquid added to the system will be commensurate with the liquid removed from the system.

Figure 2:
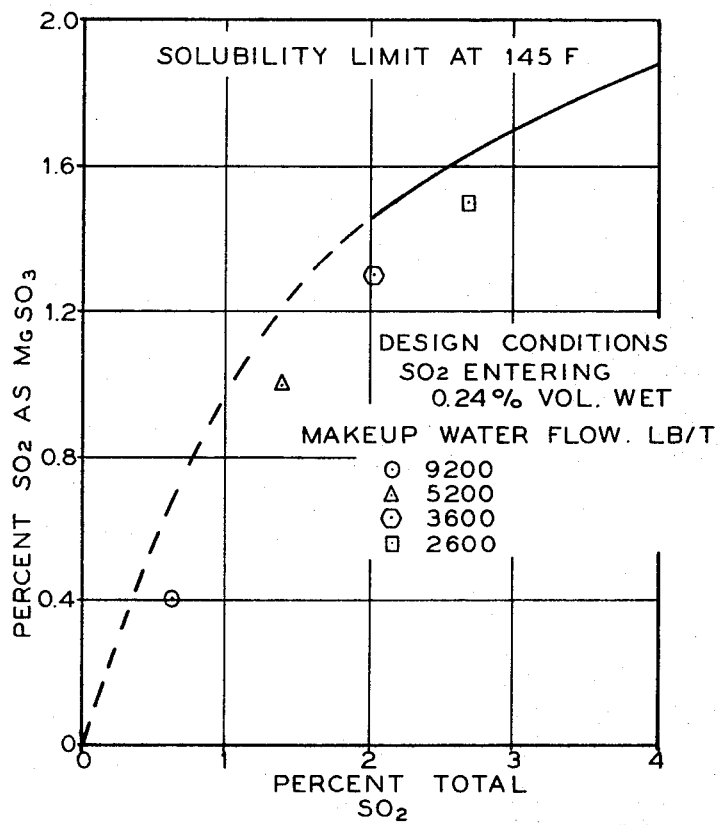
Figure 3:
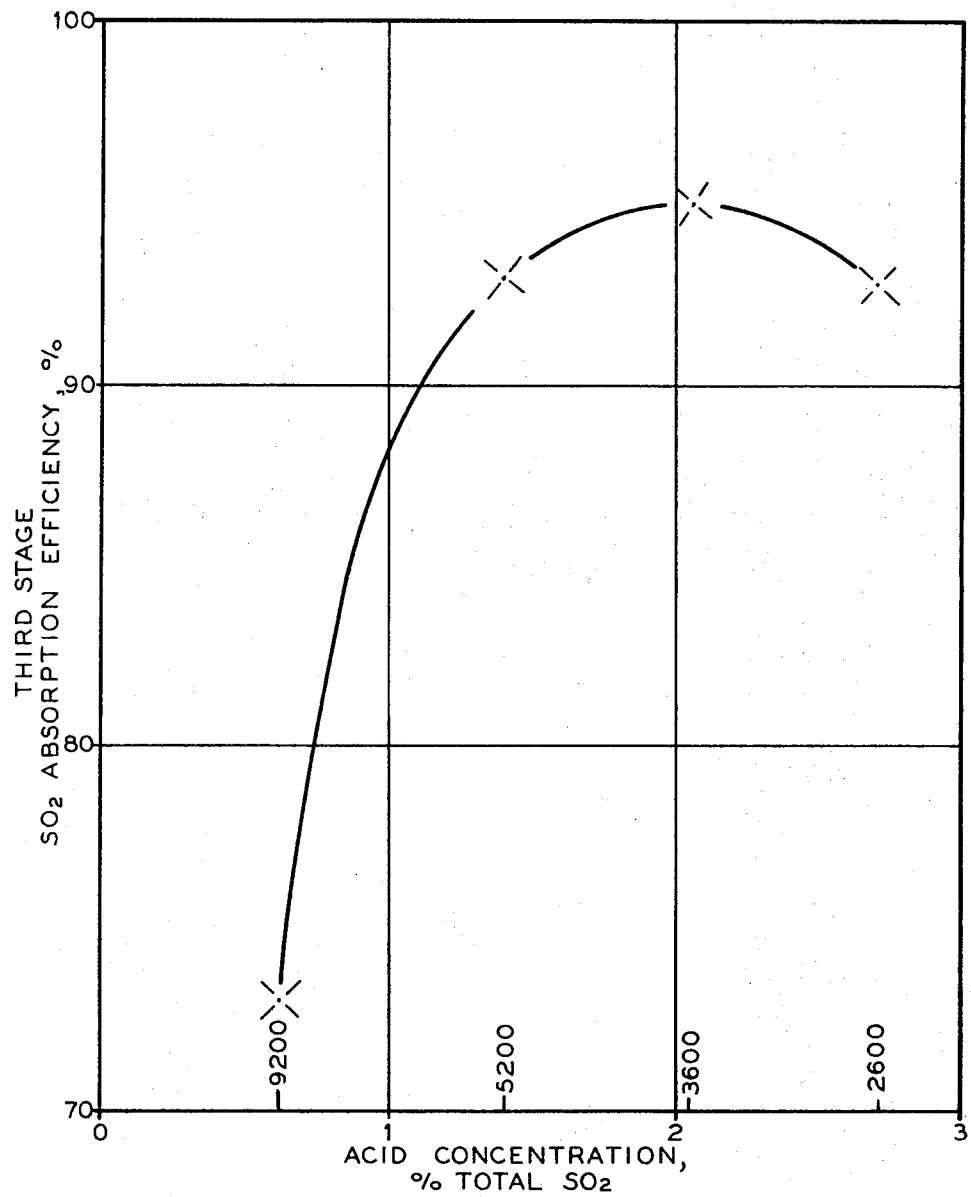
Figure 4:
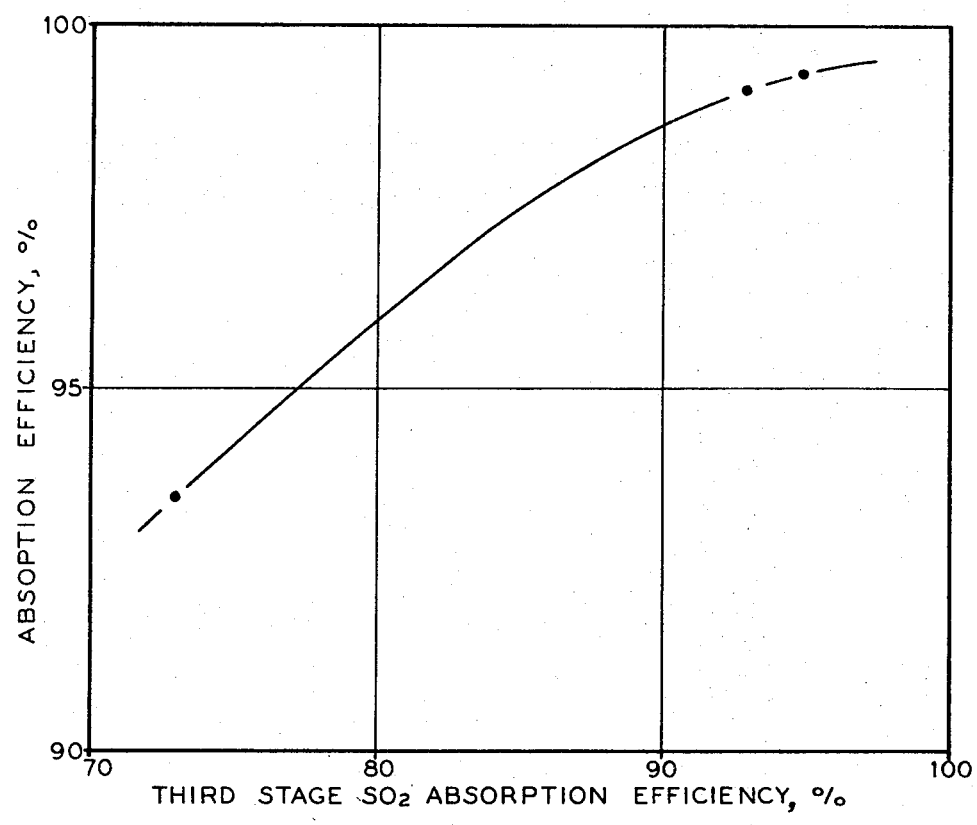

Of the drawings:

FIG. 1 is a schematic flowsheet of an $SO_2$ absorption system constructed in accordance with the present invention; and FIGS. 2, 3 and 4 are curve sheets showing the effect of the addition of makeup water to an $SO_2$ absorption system.

When used for the absorption of $SO_2$ from the products of combustion from the incineration of the residual liquor resulting from magnesium base pulping of cellulosic materials, the equipment arrangement will be generally as taught in the U.S. Pat. No. 3,273,961. In such a system the magnesium and sulfur components in the residual liquor are recovered for use in the cellulosic pulping process.

When used to absorb $SO_2$ from the gases resulting from the combustion of other sulfur containing fuels, a magnesium base liquid may also be used with the resulting product liquid subsequently treated to separate the sulfur and magnesium components. In such a system the sulfur may be reclaimed in concentrated form with the magnesium components recycled to the absorption system. Regardless of the source of the $SO_2$ containing gases, i.e. whether from the combustion of residual magnesium base pulping liquor or other sulfur containing fuels, the absorption system will be substantially the same. In either case, the gases leaving the combustion area are cooled by heat exchange to produce usable steam and to heat combustion air. Before passing through the $SO_2$ absorption zones the entrained solids in the combustion gases are largely removed and any desirable further cooling of the gases is accomplished. Ordinarily, the gases passing through the $SO_2$ absorption zones will be cooled to the dew point temperature of about 160° F. by spray contact with the absorbing liquid.

In the illustrated embodiment of the invention the numeral 10 represents the combustion apparatus, gas-cooling arrangements and MgO dust removal equipment common in the art, with the cooled gases containing $SO_2$ and a residue of MgO dust passed through a gas duct 11 into the first stage or zone 12 of the $SO_2$ absorption system of the invention. It will be understood that the $SO_2$ absorption system of the present invention is not limited to the particular furnace construction disclosed in the referred to patent, but is applicable to the absorption of $SO_2$ contained in carrier gas by a liquid containing magnesium where the most active absorbent is magnesium monosulfite.

The gases entering the first stage venturi scrubber 12 through the duct 11 are contacted by a liquid injected into the gas by a multiplicity of nozzles 13 positioned upstream, in a gas flow sense, of the converging portion 14 of the venturi. The liquid spray includes recirculated liquid introduced to the manifold 16 through pipe 17. In leaving the venturi throat 18 the gas and liquid mixture passes through a pressure regain, diverging section 20 to a tank 21 provided at the lower end of the venturi unit 12. The tank is constructed with an upper cylindrical portion 22 and a lower inverted frustoconical portion 23 with separation of entrained liquids and solids from the gases occurring in a gas-turning space in the portion 22. A further cleaning effect may be obtained by the use of a pad (not shown) of compacted metal mesh or the like positioned adjacent the gas outlet 24 from the tank. The separated liquid accumulates in a pool in the portion 23 of the tank and is withdrawn in part by a pump 25 for delivery to the pipe 27 and thence to manifold 16. The quantity of liquid recirculated to the manifold 16 is controlled so that the liquor contacting the gas will be coordinated with the gas flow quantity introduced through the duct 11. A controlled flow of liquid is withdrawn from the tank 21 through pipe 29 for disposal. Such liquid contains the absorbed $SO_2$ in the form of magnesium bisulfite, with the liquid thereafter treated to form cooking acid in the pulping process or converted to other useful forms, i.e. elemental sulfur, concentrated $SO_2$ liquid or the like by known procedures.

The gases leaving the first stage venturi 12 pass through a duct 26 connecting the outlet 24 in the upper end of the tank 21 with the inlet side of the second stage venturi scrubber 27 wherein the gases are again intimately contacted by a spray liquid from nozzles 28 positioned upstream in a gas flow sense, of the throat portion 30 of the venturi. As described in connection with the venturi unit 12, the gases in turning towards the gas outlet duct 32 of the tank 31 encourage separation of entrained liquid from the gas with further liquid separation obtained by the use of a demister pad of compact wire mesh (not shown) positioned in the entrance of the gas outlet duct 32 from the tank 31. The separated liquid accumulates in the lower inverted frustoconical portion 33 of the tank 31 from which liquid is withdrawn by a pump 34 through a pipe system 35 interconnecting the tank 31 and the spray nozzles 28 for recirculation of liquid into contact with the gases passing through the venturi 30.

The gases pass through the duct 32 to the third stage venturi scrubber 36, where they are again subjected to spray contact with liquid introduced through nozzles 37 upstream of the throat portion 38 of the venturi. The unit 36 is similar to both of units 12 and 27 in that the gas and liquid contacted in the venturi discharges into a lower tank 40 where the gas and liquid is separated by change of flow direction with the gas discharging through duct 41 and the liquid accumulating in the inverted frustoconical portion 42. A pump 43 withdraws liquid from the portion 42 for delivery to the spray nozzles 37 through a pipe system 44.

The weight of liquid recirculated to each of the nozzles 13, 28 and 37 from the pumps 25, 34 and 43, respectively, will have a ratio of the order of 5 or 10 to 1 relative to the weight of gas passing through the absorption zones so as to attain desirable gas and liquid contact.

As shown, a pipe 45 connects the tank 40 of venturi scrubber 36 with the bottom portion 33 of venturi scrubber 27, while in a similar manner, tank 31 of venturi scrubber 27 is connected by a pipe 46 with the bottom portion 23 of venturi 12. The pipes 45 and 46 pass a controlled flow of liquid from stage to stage of the absorption system in a direction countercurrent to the gas flow through the absorption stages. Ordinarily, the rate of flow through the pipes 45 and 46 is uniform to maintain a substantially constant volume of liquid in the bottom portions of the units 36, 27, and 12.

Makeup water is provided to the absorption system via a pipe 47, which is provided with valved branch pipes 48, 50, and 51 connected with the piping systems leading to the inlet side of the recirculating pumps 43, 34, and 25 respectively. The magnesium hydroxide slurry is prepared by slaking magnesium oxide (not shown) and pumping it through a pipe 52 which is arranged for closed-circuit flow and is provided with valved off-take branch pipes 53, 54, and 55 connected with the inlet of the recirculating pumps 43, 34, and 25 respectively. The flow of the magnesium oxide to each of the pumps is regulated to provide as large a quantity of magnesium monosulfite in the liquid sprays as possible, consistent with the solution solubility limits in the particular venturi absorption unit.

In the operation of the $SO_2$ absorption system shown in FIG. 1, the flue gases entering through the duct 11 may have an $SO_2$ content which is dependent upon the fuel burned. When burning residual pulp liquor from the magnesium base pulping process the $SO_2$ content in the gases may be of the order of 1.0 percent by volume on a wet gas basis. When burning other fuels the $SO_2$ content may be lower or greater depending upon the original sulfur content, but may also be of the same general value. For purposes of illustrating the invention, it will be assumed the $SO_2$ content of the gases to be treated will be 1 percent (volume of wet gas).

It will also be understood the number of serially connected absorption stages may be either more or less than that shown, depending upon the $SO_2$ content of the entering gas, and the degree of $SO_2$ removal desired. With an $SO_2$ content of 1 percent and a three-stage arrangement as shown, an excess of 98 percent of the gaseous $SO_2$ will be absorbed when the apparatus is operated in accordance with the present invention.

The efficiency of the $SO_2$ absorption system is considerably influenced by the strength of the product acid withdrawn from the first stage absorption unit 12 through the line 29. The strength of the acid withdrawn is largely dependent upon the end use thereof. While in an $SO_2$ absorption process connected with an ordinary fuel-fired system the product acid strength may be regulated for highest $SO_2$ recovery, in a cellulosic pulping process the strength of the product acid must be regulated to be compatible with the composition of the pulp-cooking liquor. For example, a pulp mill utilizing an acid sulfite cooking process might require a total $SO_2$ requirement of 4 percent in the product acid discharged through line 29 of the absorption system. Under such conditions with a specific gas flow through the absorption system makeup water flow to the system to compensate for acid withdrawal will be 9,200 pounds per ton of pulp produced per day. In a pulp mill utilizing a product acid of 6.24 percent total $SO_2$ and 3.52 percent combined $SO_2$ the makeup water flow to the system under otherwise comparable conditions would be 5,200 pounds of pulp produced per day.

FIG. 2 is a curve drawn to illustrate the effect of makeup water flow to the last stage (36 in FIG. 1) of the absorption system when the product acid discharged through line 29 has a total $SO_2$ concentration of 4 percent. In this figure, the ordinate indicates the percent $SO_2$ present in the liquid as magnesium monosulfite ($MgSO_3$) and the abscissa indicates the percent total $SO_2$ in the liquid. The solid curve indicates the solubility limit of the $MgSO_3$ in the liquid at a typical temperature of 145° F. The makeup water flow rate to the last stage absorption unit establishes the percent concentration in the liquid of magnesium monosulfite and total $SO_2$, and the curve indicates several makeup water flow rates to show the relationship between such rates and its effect on the concentration.

FIG. 3 is a curve drawn to illustrate the effect of acid concentration in the third $SO_2$ absorption zone on the efficiency of $SO_2$ removal from the gas stream in that respective stage, recognizing that the concentration in the stage is directly related to the rate of addition of makeup water to the last absorption unit. The abscissa shows the $SO_2$ absorption efficiency in percent and the ordinate shows the concentration of total $SO_2$ in the liquid contained within the absorption zone. The relationship between absorption efficiency of $SO_2$ gas (FIG. 3) is established by the makeup water flow rate as indicated from FIG. 2.

For example, using FIGS. 2 and 3, it will be noted that for a 4-percent total $SO_2$ in the absorbing liquid discharged from the absorption system to line 29, the makeup water flow to the system would be 9,200 pounds per ton of pulp per day. If all of this water was delivered to the last stage absorption unit, the acid concentration in the absorption zone would be 0.62 percent total $SO_2$ resulting in an absorption efficiency of 73 percent according to FIG. 3.

According to this invention, the makeup water would be divided with the last stage unit receiving 3,600 to 5,200 pounds of water, and the remaining makeup water delivered to the second stage unit (27 in FIG. 1). Under these conditions as shown in FIG. 3, the absorption efficiency of the third stage unit will be improved to 91 to 93 percent. The remaining makeup water diverted to the second stage absorption unit will have an insignificant effect on efficiency of the first and second stage unit for the reason that the acid concentration in the first and second stage units will be no different than if the total makeup water rate of 9,200 pounds were added to the third stage unit. The difference in $SO_2$ absorbed in the third stage unit over the range of operation possible between makeup water flow rates to that stage of 3,600 to 9,200 pounds of water is small compared to the total amount of $SO_2$ absorbed in the second and third stage units, and, therefore, has an insignificant effect on the concentration of the acid in the second stage unit.

FIG. 4 is a curve drawn to illustrate the effect of the $SO_2$ absorption efficiency of the third stage absorption unit on the total overall efficiency of the system. The efficiency of the last stage unit has a direct and proportional effect on the overall efficiency.

In operating the absorption system according to the invention as hereinbefore described will increase the overall efficiency of the system 4 to 6 percent without any increase in capital or operating costs. Such an increase in absorption efficiency will reduce the loss of costly sulfur and substantially completely eliminate the nuisance of $SO_2$ gas discharge to the atmosphere.

What is claimed is:

1. The method of absorbing gaseous $SO_2$ present in flue gases which comprises passing said gases in series through a plurality of $SO_2$ absorption zones in direct contact with an atomized liquid containing a solution of magnesium compounds including magnesium monosulfite, separating gas and liquid from each absorption zone, reinjecting a major portion of said separated liquid into the corresponding absorption zone, passing a minor portion of said separated liquid at a controlled rate from one absorption zone to another absorption zone countercurrent to the direction of gas flow through said zones, withdrawing separated liquid from the first of said absorption zones in a gas flow sense, adding a controlled quantity of magnesium slurry to each of said zones to regulate the monosulfite content therein, and adding a divided flow of makeup water to said absorption liquid in said absorption zones for optimum $SO_2$ absorption therein and to compensate for the separated liquid withdrawn from said first absorption zone.

2. The method of absorbing gaseous $SO_2$ according to claim 1 wherein at least three of said absorption zones are arranged for serial flow of $SO_2$ containing gases therethrough, and said makeup water flow is proportioned between the last and intermediate absorption zones in a gas flow sense to increase the gaseous $SO_2$ absorption efficiency of said last zone.

* * * * *